United States Patent [19]

Malamy et al.

[11] Patent Number: 5,675,765
[45] Date of Patent: Oct. 7, 1997

[54] CACHE MEMORY SYSTEM WITH INDEPENDENTLY ACCESSIBLE SUBDIVIDED CACHE TAG ARRAYS

[75] Inventors: Adam Malamy, Winchester, Mass.; Rajiv N. Patel, San Jose; Norman M. Hayes, Sunnyvale, both of Calif.

[73] Assignee: Sun Microsystems, Inc., Mountain View, Calif.

[21] Appl. No.: 604,687

[22] Filed: Feb. 21, 1996

Related U.S. Application Data

[63] Continuation of Ser. No. 316,388, Sep. 30, 1994, abandoned, which is a continuation of Ser. No. 875,356, Apr. 29, 1992, abandoned.

[51] Int. Cl.$^6$ .............................. G06F 12/08; G06F 13/16
[52] U.S. Cl. .......................... 395/473; 395/455; 395/463; 395/471; 395/494; 395/495
[58] Field of Search .......................... 395/455, 458, 395/463, 471, 473, 494, 495

[56] References Cited

U.S. PATENT DOCUMENTS

| | | | |
|---|---|---|---|
| 4,439,829 | 3/1984 | Tsiang | 395/445 |
| 4,525,777 | 6/1985 | Webster et al. | 395/471 |
| 4,695,943 | 9/1987 | Keeley et al. | 395/467 |
| 4,928,239 | 5/1990 | Baum et al. | 395/463 |
| 4,939,641 | 7/1990 | Schwartz et al. | 395/473 |
| 5,029,070 | 7/1991 | McCarthy et al. | 395/470 |
| 5,060,136 | 10/1991 | Furney et al. | 395/455 |
| 5,067,078 | 11/1991 | Talgam et al. | 395/403 |
| 5,210,845 | 5/1993 | Crawford et al. | 395/455 |
| 5,268,995 | 12/1993 | Diefendorff et al. | 395/122 |
| 5,319,766 | 6/1994 | Thaller et al. | 395/473 |
| 5,361,340 | 11/1994 | Kelly et al. | 395/403 |

OTHER PUBLICATIONS

*The Cache Memory Handbook*; Jim Handy; Academic Press, Inc.; 1993; pp. 132–133.

*Primary Examiner*—Eddie P. Chan
*Assistant Examiner*—Reginald G. Bragdon
*Attorney, Agent, or Firm*—Blakely Sokoloff Taylor & Zafman

[57] ABSTRACT

Two independently accessible subdivided cache tag arrays and a cache control logic is provided to a set associative cache system. Each tag entry is stored in two subdivided cache tag arrays, a physical and a set tag array such that each physical tag array entry has a corresponding set tag array entry. Each physical tag array entry stores the tag addresses and control bits for a set of cache lines. The control bits comprise at least one validity bit indicating whether the data stored in the corresponding cache line is valid. Each set tag array entry stores the descriptive bits for a set of cache lines which consists of the most recently used (MRU) field identifying the most recently used cache lines of the cache set. Each subdivided tag array is provided with its own interface to enable each array to be accessed concurrently but independently by the cache control logic which performs read and write operations against the cache. The cache control logic makes concurrent and independent accesses to the separate tag arrays to read and write the control and descriptive information in the tag entries. The accesses are grouped by type of operation to be performed and each type of accesses is made during predesignated time slots in an optimized manner to enable the cache control logic to perform certain selected read/write accesses to the physical tag array while performing other selected independent read/write accesses to the set tag array concurrently.

14 Claims, 7 Drawing Sheets

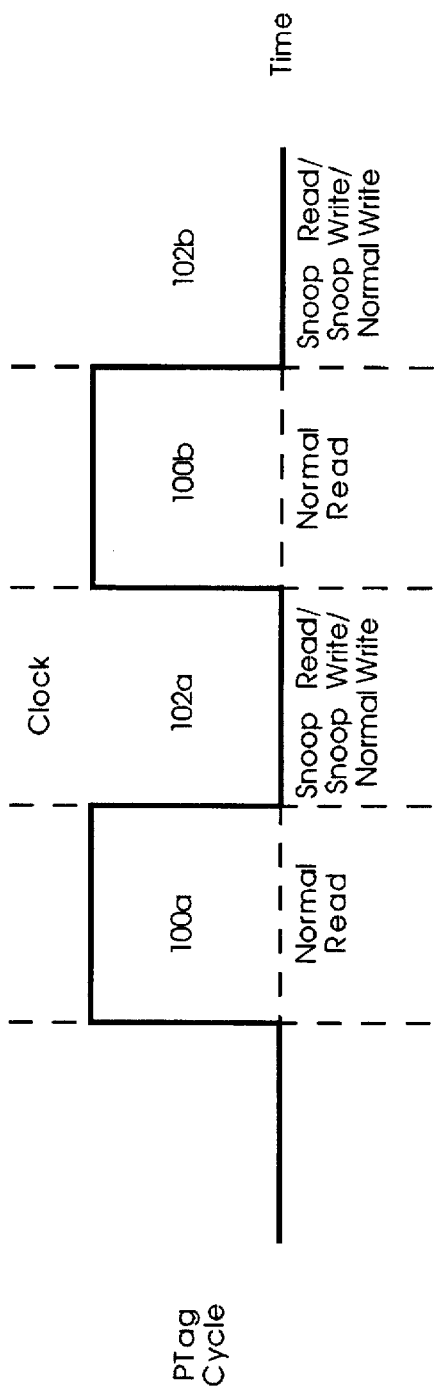
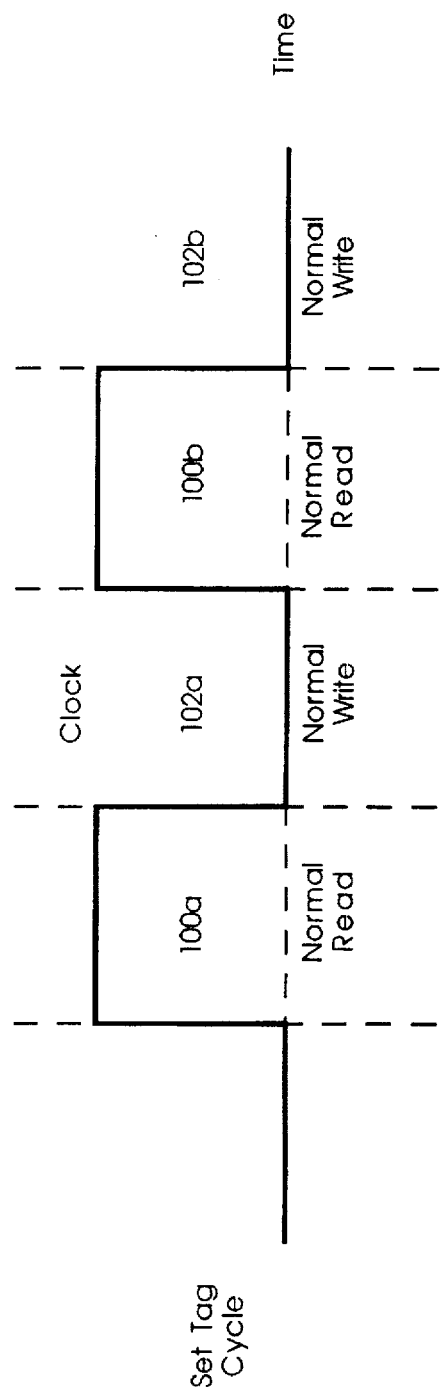

CACHE MEMORY SYSTEM WITH INDEPENDENTLY ACCESSIBLE SUBDIVIDED CACHE TAG ARRAYS

This is a continuation of U.S. Patent Application (application Ser. No. 08/316,388) filed Sep. 30, 1994, now abandoned, which is a continuation of U.S. Patent Application (application Ser. No. 07/875,356), filed Apr. 29, 1992, now abandoned.

BACKGROUND OF THE INVENTION

1. Field of the Invention

The present invention relates to the field of a cache memory system in a computer, and more particularly, the invention relates to a cache controller having a separate physical tag and set tag arrays in the cache memory system.

2. Art Background

Typically the central processing unit (CPU) in a computer system operates at a substantially faster speed than the main memory of the computer system. Most computer systems provide a cache memory which can operate at a higher speed than the main memory to buffer the data and the instructions between the main memory and the high speed CPUs. At any particular point in time, the cache memory stores a subset of the data and instructions stored in the main memory.

When the processor issues a read request and an address identifying the storage location in main memory for the desired data, the cache memory is checked by comparing the received address to the tag fields in the tag array of the cache memory. If the desired data is stored in the cache, then a "hit" occurs and the desired data is immediately available to the main processor. If the desired data is not stored in the cache, then a "miss" occurs, and the desired data must be fetched from the slower main memory. A cache line is chosen and reallocated to store the fetched data.

Typically, for a set associative cache, the cache line replacement information in the cache tag array for the cache line with the cache hit is also updated in the case of a cache hit. Likewise, the cache data validity information in the cache tag array for the cache line allocated to store the fetched data is also updated in the case of a cache miss.

To enhance cache hit rate and reduce cache miss penalty, typically data are fetched from main memory as a block with the desired data fetched first. Additionally, the desired data is simultaneously by-passed to the processor, thereby allowing the processor to proceed. As a result, another cache read may be received before the cache fill is completed. Therefore, if the cache data validity information in the cache tag array for the cache line allocated to stored the fetched data is updated at the end of the cache fill, the update operation may conflict with the updating of the replacement information in the cache tag array for the cache line with a subsequent cache hit. The cache controller will have to arbitrate the two update operations, and perform them in separate clock cycles. As a result, system performance is slowed. Thus, it is desirable if a replacement information update and an independent validity information update can be performed concurrently.

Furthermore, in multi-processor systems, the memory system must exhibit cache coherency. In general, the need for cache coherency is involved where either multi-processors may access the same memory. For example, where a program is running on a multi-processor system, the program may have copies of the same data in several caches. However, if one processor updates the main memory, stale data may be left in a cache memory corresponding to that address in the main memory. Thus, every cache monitors write accesses made against the main memory by the other processors, such that in the event of a copy of the data being updated is maintained in the cache, it will know to invalidate its staled copy.

Snooping is a protocol to locate and invalidate staled copies of data being updated. In snooping, a cache controller accesses its tag array to determine whether it has a copy of the data being updated, and update the validity information of a corresponding tag entry in the tag array if it is determined that a copy is maintained. Typically, normal read and snooping (read or write) are performed against the cache tag array in alternate clock cycles or in parallel. Nevertheless, a snoop read as well as a snoop write operation may still conflict with a replacement information update as a result of a cache hit. In each case, when such conflict arises, the cache controller will have to arbitrate the competing operations and perform them in separate clock cycles. Similarly, the system performance is slowed. Thus, it is further desirable if a replacement information update and a snoop read/write operation can also be performed concurrently.

As will be disclosed, these objects and desired results are among the objects and desired results of the present invention which provides a method and apparatus for performing two independent cache tag operations concurrently.

For further description of cache memory, cache performance problems and improvement techniques, see J. L. Hennessy, and D. A. Patterson, *Computer Architecture—A Quantitative Approach*, pp. 402–461, (Morgan Kaufmann, 1990).

SUMMARY OF THE INVENTION

A method and apparatus for caching data stored in main memory in a manner allowing two independent cache tag operations to be performed concurrently is disclosed. The method and apparatus has particular application to cache design, in particular, cache design on a multiprocessor system.

Under the present invention, two separate cache tag arrays, a physical tag array and a set tag array, are provided to a set associative cache system having a cache with its cache lines divided into sets, and cache control logic. Corresponding tag entries are stored in the two separate cache tag arrays. Each tag entry in the physical tag array stores the tag addresses and control bits for a set of cache lines. The control bits comprise at least one validity bit indicating whether the data stored in the corresponding cache line is valid. The corresponding tag entry in the set tag array stores the descriptive bits for the same set of cache lines. The descriptive bits comprise at least a most recently used (MRU) field identifying the most recently used cache lines of the cache set. Each tag array is provided with its own interface to enable the tag entries in the two separate tag arrays being accessed concurrently but independently by the cache control logic.

The cache control logic controls read and write operations performed against the cache. The cache control logic makes concurrent and independent accesses to the separate tag arrays to read and write the control and descriptive information in the tag entries. The accesses are grouped by type and each type of accesses is made at pre-designated time slots. The type of accesses are grouped and the time slots are pre-designated in an optimized manner to enable the cache control logic to perform certain selected read/write accesses to the physical tag array while performing other selected independent read/write accesses to the set tag array concurrently.

In one embodiment, the cache control logic accesses the two separate tag arrays independently and concurrently twice in a clock cycle. In the first half of a clock cycle, the cache control logic accesses the two separate tag arrays with the same address for normal cache tag reads. In the second half of the clock cycle, the cache control logic accesses the physical tag array with one address for either a snoop read, a snoop write or a normal cache tag write, and the set tag array with either the same address or another address for a normal cache tag write.

As a result, replacement information of a cache line may be updated, while either tag address of another cache line may be snoop read, or validity information of another cache line may be snoop or normally written concurrently.

BRIEF DESCRIPTION OF THE DRAWINGS

The objects, features, and advantages of the present invention will be apparent from the following detailed description of the preferred embodiment of the invention with references to the drawings in which:

FIGS. 6a–b illustrate the grouping and timing of accesses to the physical and set tag arrays for one embodiment of the present invention.

DETAILED DESCRIPTION

PRESENTLY PREFERRED and ALTERNATE EMBODIMENTS

A method and apparatus for caching data stored in main memory in manner that allows two independent cache tag operations to be performed concurrently is disclosed. The method and apparatus has particular application to cache design, in particular, cache design on a multiprocessor system.

In the following description, for purposes of explanation, specific nomenclature is set forth to provide a thorough understanding of the present invention. However, it will be apparent to one skilled in the art that these specific details are not required in order to practise the present invention. In other instances, well known circuits and devices are shown in block diagram form in order not to obscure the present invention unnecessarily.

Figure 1:
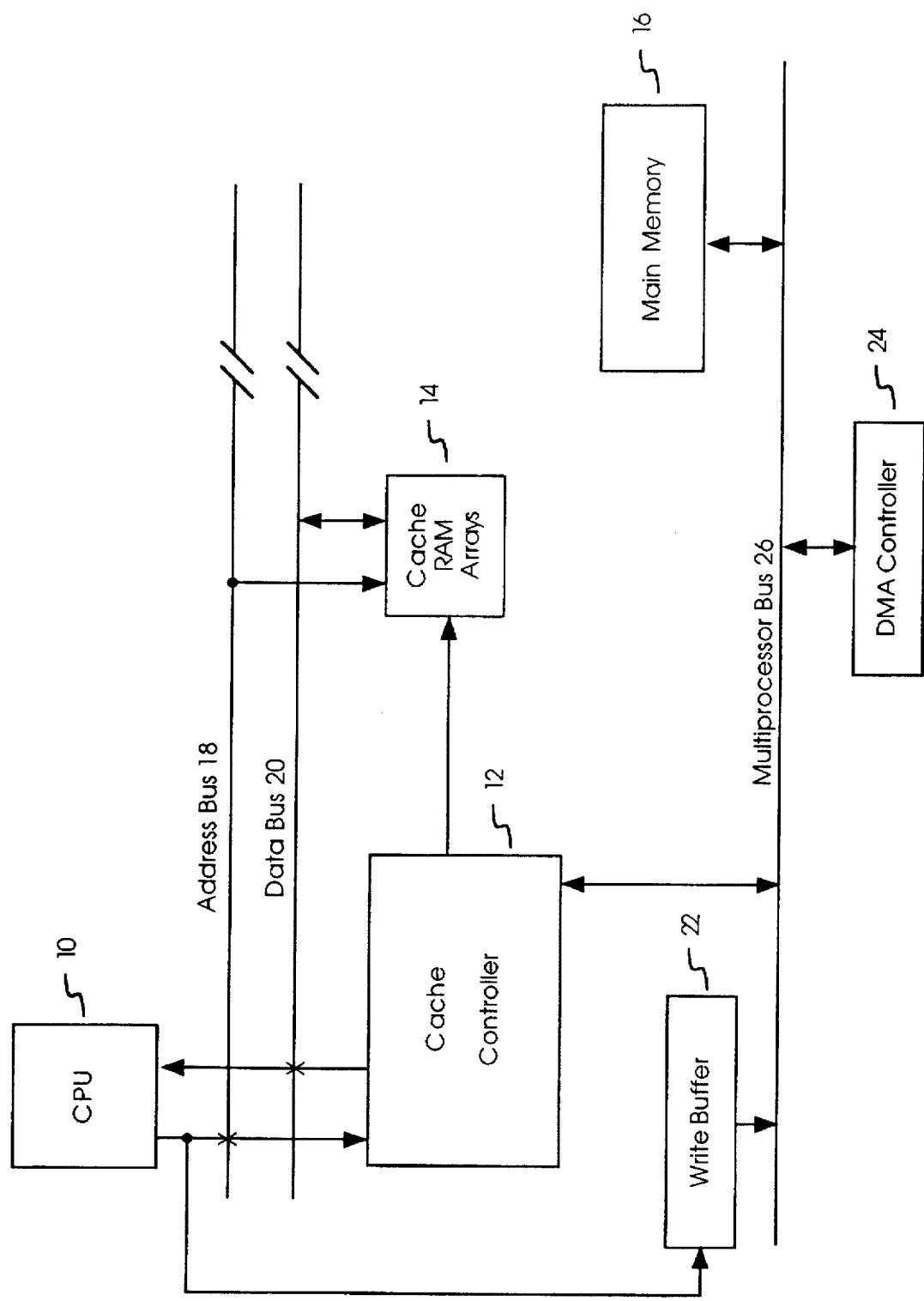
FIG. 1 illustrates an exemplary computer system which incorporates the cache system of present invention.

Referring now to FIG. 1, an exemplary computer system employing the cache memory system of the present invention is illustrated. Shown is the cache controller 12 and cache memory 14 of the present invention coupled to the central processing unit (CPU) 10, the main memory 16 and to each other. The cache controller 12 and cache memory 14 are coupled to the CPU 10 through the address bus 18 and the data bus 20, and to the main memory 16 through the multiprocessor bus 26. The cache controller 12 and cache memory 14 cooperate with the main memory 16 to provide data and instructions to the CPU 10. In particular, in the event of a cache miss, data are fetched from the main memory 16 as a block, with the requested data fetched first.

The requested data is simultaneously by-passed to the CPU 10. The cache controller 12 and cache memory 14 will be described in further details with references to FIGS. 2–6. The CPU 10 and the main memory 16 are intended to represent a broad category of these elements found in most computer systems. Their constitutions and basic functions are well known and will not be described further.

Also shown is the CPU 10 coupled to the multiprocessor bus 26 through a write buffer 22, and a DMA controller 24 coupled directly to the multiprocessor bus 26. The write buffer 22 and the DMA controller 24 are also intended to represent a broad category of these elements found in most computer systems. Their constitutions and basic functions are also well known and will not be described further. Although the exemplary computer system is illustrated with a DMA controller 24, it will be appreciated that the present invention may be practiced on any computer system having modules which share memory resources, such as a multiprocessor system.

Figure 2:
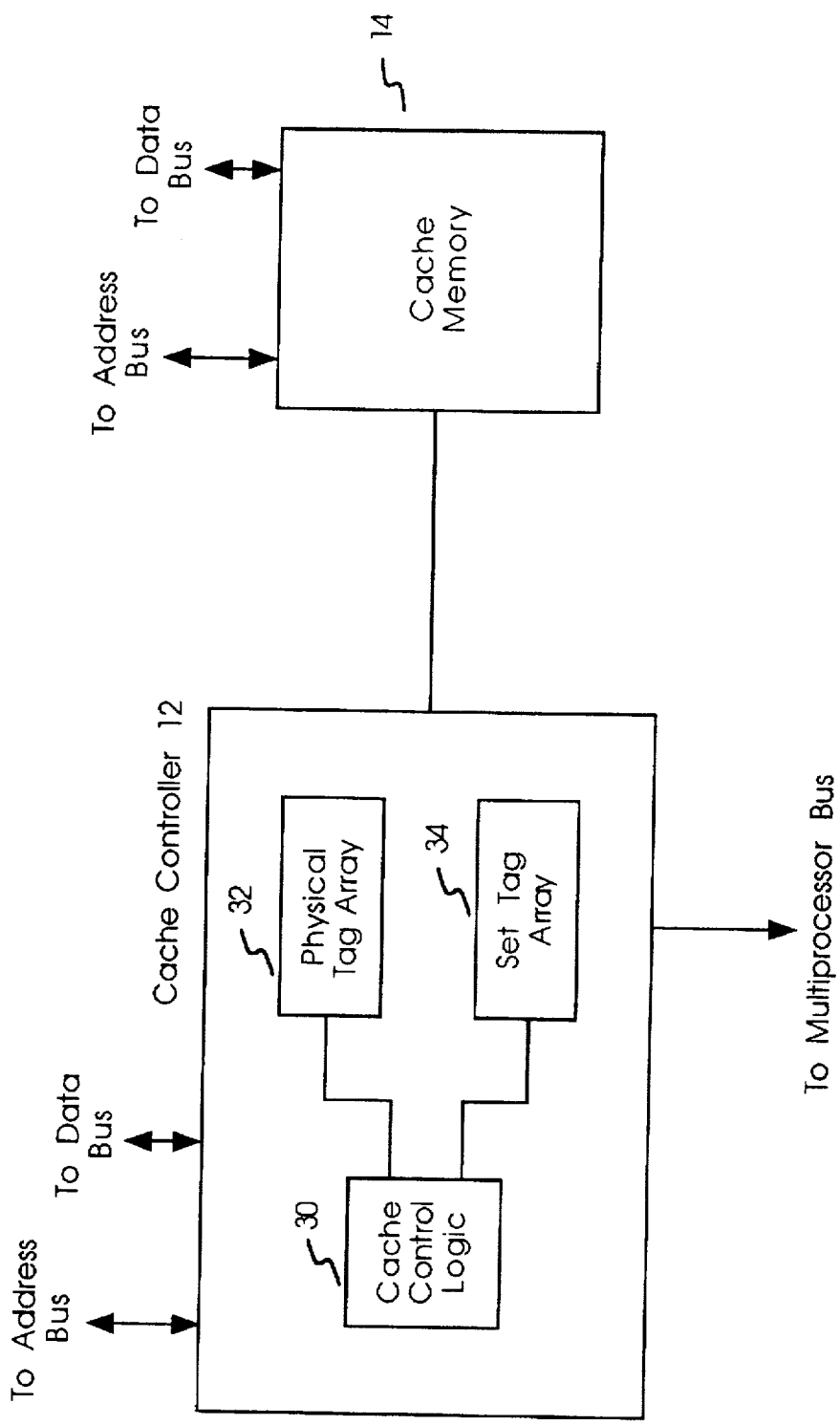
FIG. 2 illustrates the cache controller and cache memory of the present invention.

Referring now to FIG. 2, the cache controller and cache memory of the present invention are illustrated. Shown in FIG. 2 is the cache controller 12 and the cache memory 14 coupled to each other. The cache controller 12 comprises cache control logic 30, and two separate cache tag arrays 32 and 34. Together, the cache control logic 30, and the two separate cache tag arrays 32 and 34 cooperate to control read and write accesses to the cache memory 14.

The cache memory 14, and the separate cache tag arrays, 32 and 34, will be described in order in further detail with references to FIGS. 3a, 3b–3c and 4. Except for the manner the cache control logic 30 cooperates with the two separate cache tag arrays, 32 and 34, the cache control logic 30 is intended to represent a broad category of cache control logic found in most computer systems. Its constitutions and basic functions are well known and will not be described further. The manner in which the cache control logic 30 cooperates with the two separate cache tag arrays, 32 and 34, will be described in further detail with references to FIGS. 5a–5b and 6a–6b.

Figure 3A:
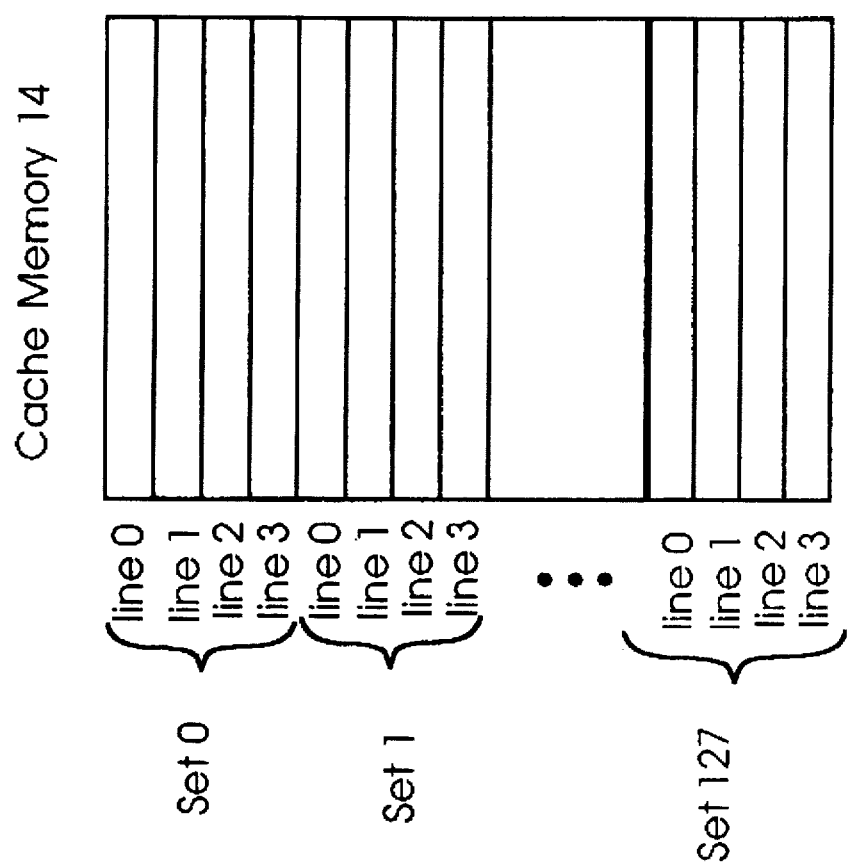
FIGS. 3a–c illustrate the cache, the physical tag array and the set tag array of the present invention.

Referring now to FIG. 3a, one embodiment of the cache memory is illustrated. Shown is the cache memory 14 comprising 512 cache lines divided into 128 sets, each set having 4 cache lines. Each memory block in main memory is assigned to one of the 128 sets, and may be stored in any one of the four cache lines of the assigned set.

Figure 3C:
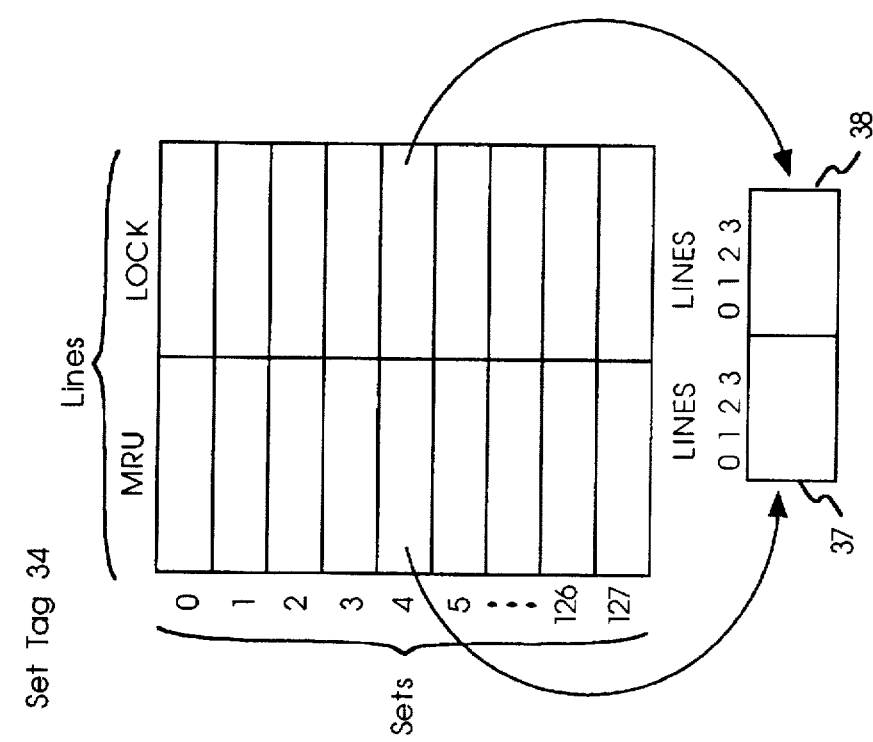
Figure 3B:
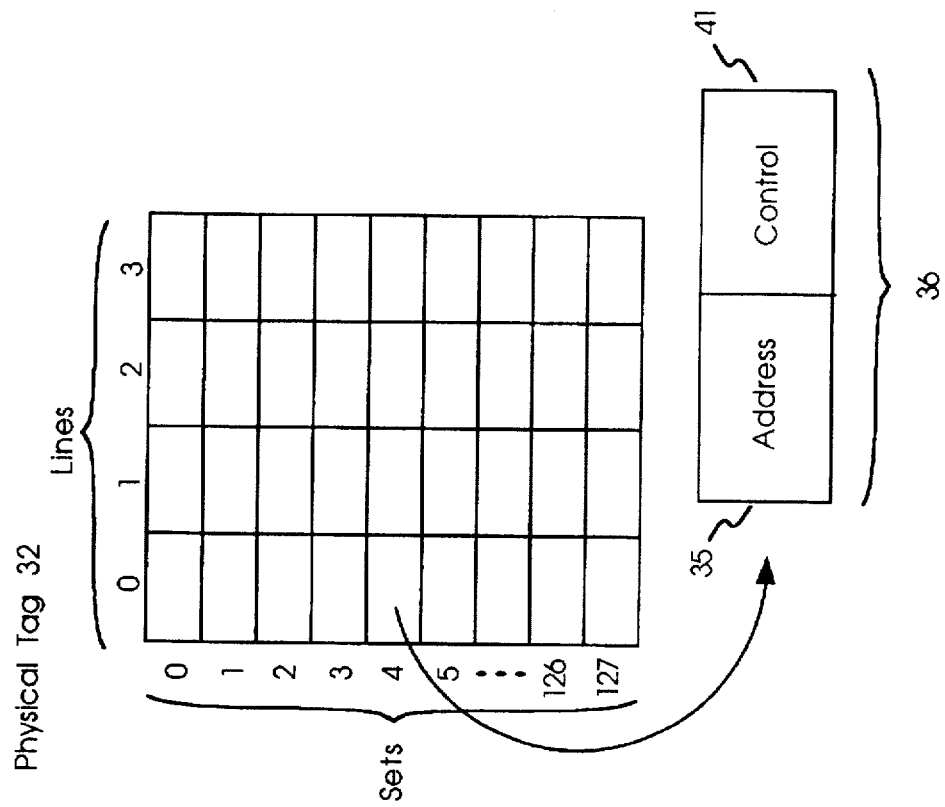

Referring now to FIG. 3b, a corresponding embodiment of the physical tag array is illustrated. Shown is the physical tag array 32 comprising 128 tag entries, one for each of the 128 sets of cache lines. Each tag entry comprises an address tag 35 and control bits 41 for each of the cache line of the cache set. Each group of control bits 41 comprises at least one valid bit for indicating whether the data stored in the particular cache line of the cache set are valid or not.

Referring now to FIG. 3c, a corresponding embodiment of the separate set tag array is illustrated. Shown is the set tag array 34 comprising 128 corresponding tag entries, one for each of the same 128 sets of cache lines. Each tag entry comprises a number of descriptive attributes of the cache set. The descriptive attributes comprise a group of most recently used (MRU) bits 37 for indicating the most recently used cache lines of the cache set. The usage information is used for selecting and reallocating a cache line to receive a block of data fetched from main memory. The descriptive attributes may further comprise other descriptive information, e.g. a group of lock bits 38 indicating the locked cache lines of a cache set, preventing the locked cache lines from being selected and reallocated to receive data fetched from main memory.

While the cache memory and the separate cache tag arrays of the present invention is being described with a four way associative embodiment having 128 sets, it will be appreciated that the present invention may be practiced with other embodiments of set associative cache, and other types of cache mapping.

Figure 4:
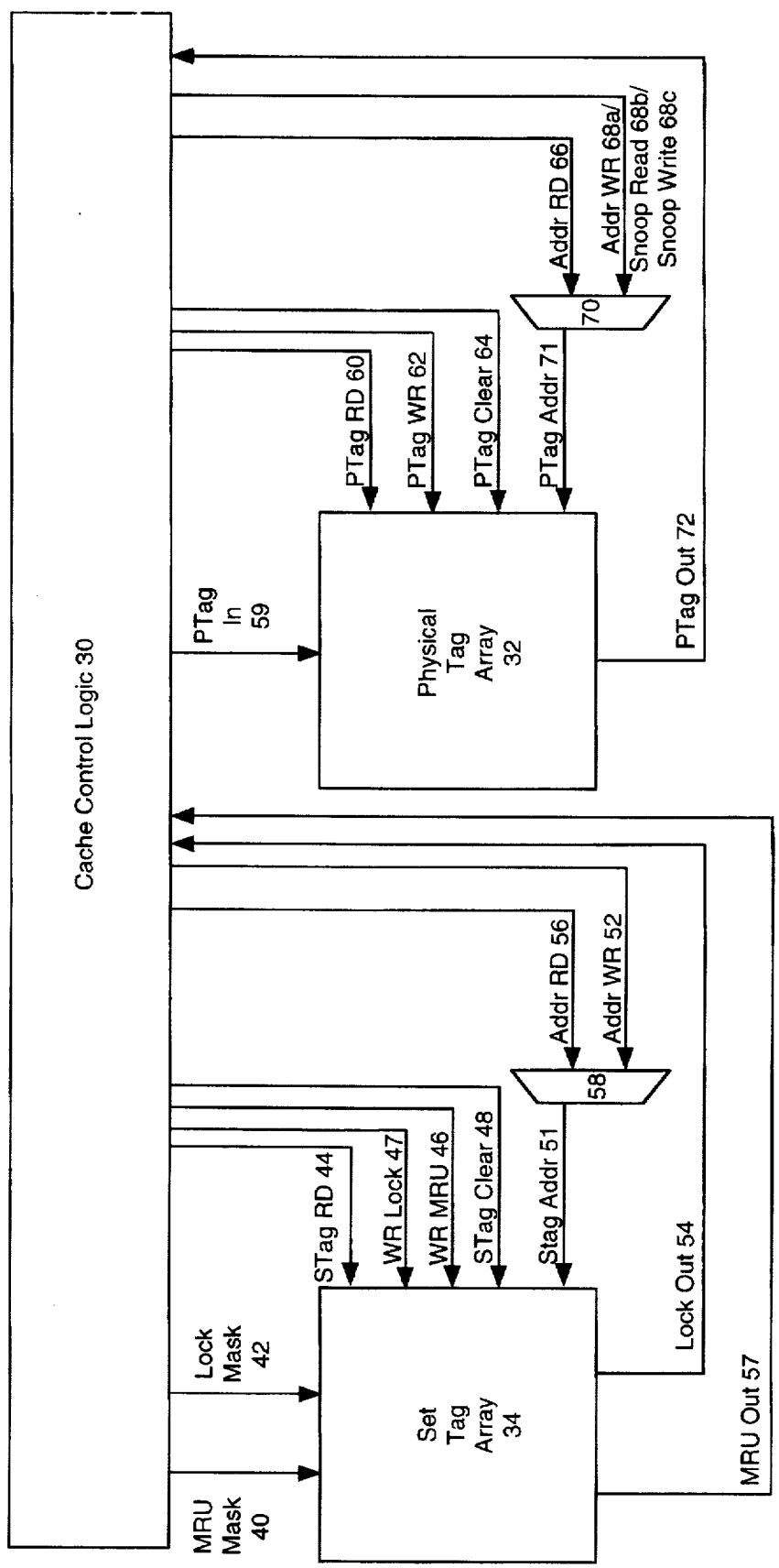
FIG. 4 illustrates the interface to the physical tag array and the set tag array of the present invention.

Referring to FIG. 4, one embodiment of the interface between the cache control logic 30 and the set tag array 32, and one embodiment of the interface between the cache control logic 30 and the physical tag array 34 are illustrated. Shown are two similar but separate interfaces between the cache control logic 30 and the set tag array 32 and the physical tag array 34, providing concurrent but independent accesses to the two tag arrays 32 and 34.

For each read cycle, the set tag array 34 receives a read address 56 through the multiplexor 58, and a read control signal 44, as inputs. In response, the set tag array 34 outputs the descriptive attributes, MRU and lock bits, 57 and 54, through independent output lines. For each write cycle, the set tag array 34 receives a write address 52 through the multiplexor 58, and descriptive attributes, MRU and lock data, 40 and 42, and their corresponding control signals, 46 and 47, independently, as inputs. In response, the set tag array 34, updates the addressed tag entry accordingly. Additionally, the set tag array 34 may be cleared and initialized by the cache control logic 30 via the STag clear signal 48.

Still referring to FIG. 4, for each read cycle, the physical tag array 32 receives either a normal read address 66 or a snoop address 68b through the multiplexor 70, and a read control signal 60, as inputs. In response, the physical tag array 32 out-puts the tag addresses and the control bits 72 through its output lines. For each write cycle, the physical tag array 32 receives either a normal cache tag write address 68a or a snoop write address 68c through the multiplexor 70, the tag entry updates 59, and a write control signal 62, as inputs. In response, the physical tag array 32, updates the addressed tag entry accordingly. Additional the physical tag array 32 may be cleared and initialized by the cache control logic 30 via the PTag clear signal 64.

Figure 5B:
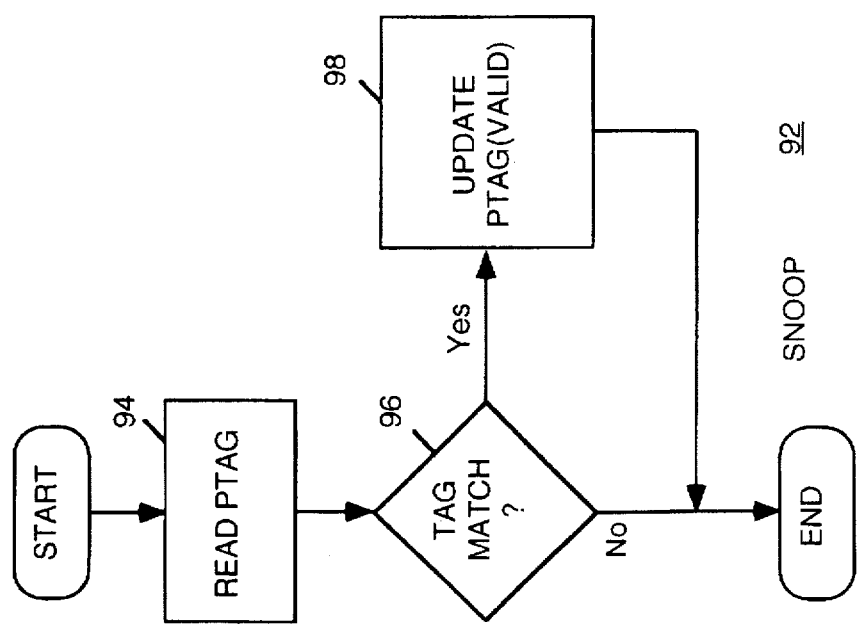
FIGS. 5a–b are flow diagrams illustrating the cache control logic of the present invention.
Figure 5A:
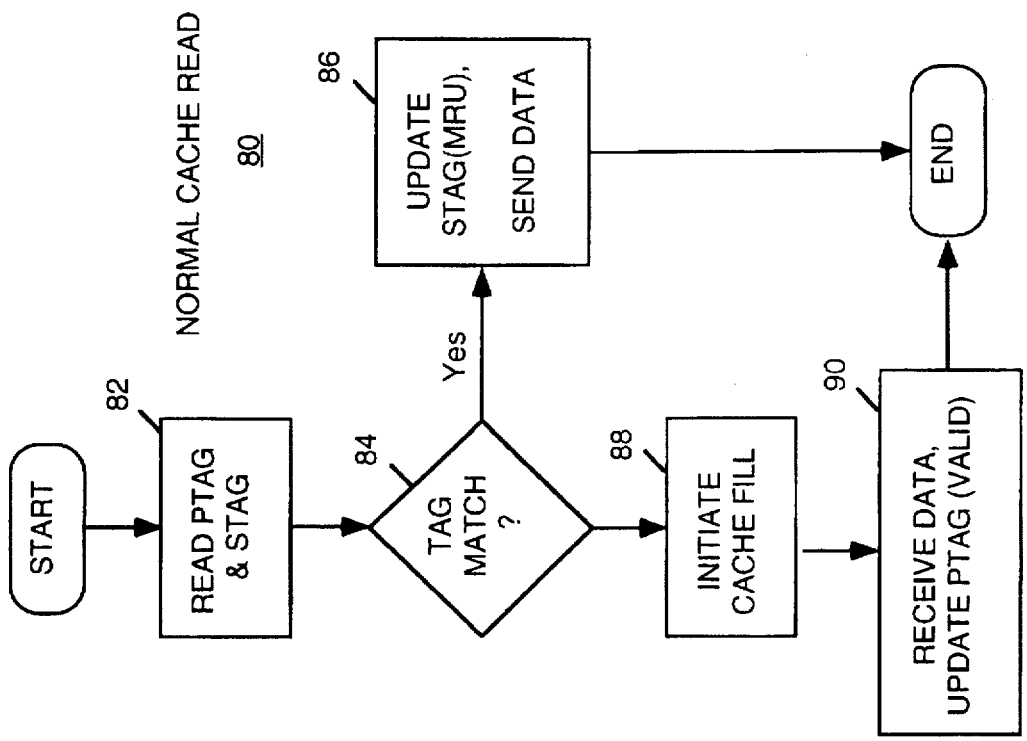

Referring now to FIGS. 5a–5b, two block diagrams illustrating the operation flow and accesses to the two separate cache tag arrays by the cache control logic when handling a normal cache read and a snoop operation are shown. As shown in FIG. 5a, upon detecting a normal cache read, the cache control logic accesses the physical tag array and the set tag array with the same address independently and concurrently, block 82. Based on the tag entry read out of the physical tag array, the cache control logic determines whether there is a tag match (cache hit), block 84. If there is a tag match, the cache control logic modifies the MRU bits of the corresponding tag entry read out of the set tag array and writes the modified tag entry back into the set tag array, block 86. Concurrently, the cache control logic causes the data to be read out of the cache, block 86. If there is no tag match (cache fill), the cache control logic initiates a cache fill, block 88. Upon completion of the cache fill, the cache control logic accesses the physical tag array to update the valid bit, block 90. As will be obvious from the description of FIGS. 6a–6b to follow, not withstanding the fact that the cache control logic may have to update the MRU bits of a different tag entry as a result of a subsequent cache hit at this time, both operations are performed independently and concurrently, without having to arbitrate and perform them at separate time.

As shown in FIG. 5b, upon detecting a snoop operation, the cache control logic accesses the physical tag array, block 94. Based on the tag entry read out of the physical tag array, the cache control logic determines if there is a tag match, block 96. If there is a tag match (copy in cache), the cache control logic modifies the valid bit of the tag entry read out of the physical tag array, and writes the modified tag entry back into the physical tag array, block 98. If there is no tag match (no copy in cache), the cache control logic takes no further action. As will be obvious from the description of FIGS. 6a–6b to follow, not withstanding the fact that the cache control logic may have to update the valid bit of a different tag entry as a result of the completion of a previously initiated cache fill at the same time the snoop read or the snoop write is performed, in both cases, the operations are performed independently and concurrently, without having to arbitrate and perform the competing operations at separate time.

Referring now to FIGS. 6a–6b, two diagrams illustrating one embodiment of the grouping and timing of the cache control logic accesses to the separate tag arrays are shown. In this embodiment, the cache control logic accesses the physical tag array and the set tag array twice per clock cycle, e.g. 100a and 102a. In the first half of a clock cycle, 100a or 100b, by virtue of the separate tag array architecture and the separate interfaces described in FIGS. 3b–3c, and 4, the cache control logic independently and concurrently accesses the physical and set tag arrays with the same address for a normal tag read. Although the same address is used to concurrently access the physical and set tag arrays, the concurrent accesses are nevertheless made independently. In the second half of the a clock cycle, 102a or 102b, the cache control logic accesses the physical tag array with an address for either a snoop read, a snoop write or a normal tag write. By virtue of the separate tag array architecture and the separate interfaces described in FIGS. 3b–3c, and 4, the cache control logic also independently and concurrently accesses the set tag array with either the same or a different address for a normal tag write.

As a result, the cache control logic can perform either a snoop read, a snoop write or a normal tag write of one tag entry, while at the same time updating the valid bit of another tag entry, without having to arbitrate and performs the competing operations at different times, thereby further improving system performance.

Although the present invention has been described with the above embodiment of access type grouping and timing designation, it will be appreciated that the present invention may be practiced with other embodiments of access type grouping and timing designation to provide different optimization of independent and concurrent accesses.

While the present invention has been described in terms of a presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of restrictive on the present invention.

What is claimed is:

1. In a computer system comprising a central processing unit (CPU) and a main memory, a cache memory system comprising;

a cache memory coupled to the CPU and the main memory, said cache memory including a plurality of cache sets, each cache set having a plurality of cache lines to store a subset of data stored in said main memory;

a first cache tag array including a first plurality of cache tag entries corresponding to said cache sets of said cache memory, each cache tag of said plurality of cache tag entries includes identification and control information for each of said cache lines of a corresponding cache set of said cache memory, said first cache tag array further includes a first interface through which said identification and control information are accessed;

a second cache tag array includes a second plurality of cache tag entries corresponding to said cache sets of said cache memory and said first plurality of cache tag entries, each of said second plurality of cache tag entries includes descriptive information, which is different than said identification and control information, for said cache lines of said corresponding cache set of said cache memory, said second cache tag array further includes a second interface through which said descriptive information is accessed;

a cache controller, coupled to the CPU, the main memory, said cache memory and said first and second cache tag arrays, said cache controller controls read and write operations against said cache memory and performs accesses independent and concurrent to each other to said first and second cache tag arrays in order to read and write said identification, control and descriptive information in said first and second plurality of cache tag entries.

2. The cache memory system as claimed in claim 1, wherein, said identification information in each of said first plurality of cache tag entries comprises an address for each of said cache lines of said cache sets identifying main memory locations of said data stored in each of said cache lines of said cache sets, said control information in each of said first cache tag entries comprises at least one valid bit for each of said cache lines of said cache sets indicating whether said data stored in said cache lines is valid or not.

3. The cache memory system as claimed in claim 1, wherein, said cache memory is a set associative cache memory; and said descriptive information in each of said second plurality of cache tag entries includes a replacement field providing cache line replacement selection information.

4. The cache memory system as claimed in claim 1, wherein said accesses being grouped by type of operating to be performed and accesses of an operation type group being made in predesignated time slots, wherein an operation type grouping and time slot designation enables a first access of a first operation type group to be made against a first cache tag entry in said first cache tag array using a first address during a first predesignated time slot, and a second access of a second operation type group to be made concurrently against a second cache tag entry in said second cache tag array using a second address that is independent of said first address during said first predesignated time slot, and said operation type grouping and time slot designation further enables said cache controller to make a third access of a third operation type group against a third cache tag entry in said first cache tag array using a third address during a second predesignated time slot and a fourth access of a fourth operation type group against a fourth cache tag entry in said second cache tag array using a fourth address that is independent of said third address during said second predesignated time slot.

5. The cache memory system as claimed in claim 4, wherein, said first and second predesignated time slots are first and second halves of a clock cycle.

6. The cache memory system as claimed in claim 4, wherein, said first and second accesses are for normal tag reads of said first and second cache tag entries in said first and second cache tag arrays respectively, said first and second addresses are identical.

7. The cache memory system as claimed in claim 4, wherein, said third access is a selected one of an access for snoop read, snoop write and normal tag write of said third cache tag entry in said first cache tag array;

said fourth access is an access for normal tag write of said fourth cache tag entry in said second cache tag array, said third and fourth addresses are identical if said third access is an access for normal tag write of said third cache tag entry.

8. In a computer system comprising a central processing unit (CPU) and a main memory, a method for caching a subset of data stored in said main memory, said method comprising the steps of:

storing said subset of data stored in said main memory in a plurality of cache lines of cache sets of a cache memory coupled to said CPU and said main memory;

storing a first plurality of cache tag entries in a first cache tag array, said first plurality of cache tag entries corresponding to said cache sets of said cache memory, each of said first plurality of cache tag entries includes identification and control information for each of said cache lines of a corresponding cache set of said cache memory, said first cache tag array further includes a first interface through which said identification and control information are accessed;

storing a second plurality of cache tag entries in a second cache tag array, said second plurality of cache tag entries corresponding to said cache sets of said cache memory and said first cache tag entries, each of said second plurality of cache tag entries includes descriptive information which is different than said identification and control information, for said cache lines of said corresponding cache set of said cache memory, said second cache tag array further includes a second interface through which said descriptive information is accessed;

controlling read and write operations against said cache memory, and said first and second cache tag arrays by a cache controller coupled to said CPU, said main memory, said cache memory and said first and second cache tag arrays, said cache controller performing accesses independent and concurrent to each other to said first and second cache tag arrays in order to read and write said identification, control and descriptive information in said first and second tag entries, said accesses being grouped by type of operation to be performed and accesses of an operation type group being made in predesignated time slots.

9. The method as claimed in claim 8, wherein said identification information in each of said first plurality of cache tag entries includes an address for each of said cache lines of said cache sets identifying main memory locations of said data stored in each of said cache lines of said cache sets, said control information in each of said first plurality of cache tag entries includes at least one valid bit for each of said cache lines of said cache sets indicating whether said data stored in said cache lines is valid or not.

10. The method as claimed in claim 8, wherein, said cache memory is a set associative cache memory; and said descriptive information in each of said second plurality of cache tag entries consists of a replacement field providing cache line replacement selection information, said replacement field having most recently used bits and lock bits.

11. The method as claimed in claim 8, wherein said accesses being grouped by type of operating to be performed and accesses of an operation type group being made in predesignated time slots, wherein an operation type grouping and time slot designation enables a first access of a first operation type group to be made against a first cache tag entry in said first cache tag array using a first address during a first predesignated time slot, and a second access of a second operation type group to be made concurrently against a second cache tag entry in said second cache tag array using a second address that is independent of said first address during said first predesignated time slot, and said operation type grouping and time slot designation further enables said cache controller to make a third access of a third operation type group against a third cache tag entry in said first cache tag array using a third address during a second predesignated time slot and a fourth access of a fourth operation type group against a fourth cache tag entry in said second cache tag array using a fourth address that is independent of said third address during said second predesignated time slot.

12. The method as claimed in claim 11, wherein, said first and second predesignated time slots are first and second halves of a clock cycle.

13. The method as claimed in claim 11, wherein, said accesses are for normal tag reads of said first and second cache tag entries in said first and second cache tag arrays respectively, said first and second addresses are identical.

14. The method as claimed in claim 11, wherein, said third access is a selected one of an access for snoop read, snoop write and normal tag write of said third cache tag subdivision entry in said first cache tag array;

said fourth access is an access for normal tag write of said fourth cache tag subdivision entry in said second cache tag array, said third and fourth addresses are identical addresses if said third access is an access for normal tag write of said third cache tag subdivision entry.

* * * * *